United States Patent
Hirai

(10) Patent No.: US 9,317,230 B2
(45) Date of Patent: Apr. 19, 2016

(54) MANAGEMENT APPARATUS, CONTROL METHOD THEREFOR, AND NON-TRANSITORY COMPUTER-READABLE MEDIUM FOR MANAGING POWER CONTROL

(71) Applicant: CANON KABUSHIKI KAISHA, Tokyo (JP)

(72) Inventor: Masahito Hirai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 6 days.

(21) Appl. No.: 14/452,688

(22) Filed: Aug. 6, 2014

(65) Prior Publication Data

US 2015/0062626 A1 Mar. 5, 2015

(30) Foreign Application Priority Data

Aug. 27, 2013 (JP) ................................. 2013-176079
May 28, 2014 (JP) ................................. 2014-110436

(51) Int. Cl.
*G06F 3/12* (2006.01)
*G06F 1/32* (2006.01)
(Continued)

(52) U.S. Cl.
CPC .......... *G06F 3/1221* (2013.01); *G03G 15/5004* (2013.01); *G06F 1/32* (2013.01); *G06F 3/1229* (2013.01); *G06F 3/1285* (2013.01); *H04N 1/00344* (2013.01); *H04N 1/00891* (2013.01); *H04N 1/00896* (2013.01); *G03G 15/5012* (2013.01); *Y02B 60/1271* (2013.01)

(58) Field of Classification Search
CPC ....... G06F 1/26; G06F 1/3203; G06F 1/3206; G06F 1/3209; G06F 1/3215; G06F 1/3228; G06F 1/3287; H04N 1/00896; H04N 1/00885; H04N 1/00399; H04N 1/00344
See application file for complete search history.

(56) References Cited

U.S. PATENT DOCUMENTS 8,121,958 B2 * 2/2012 Motoyama ............ G06F 3/1218
358/1.15
8,464,082 B2 * 6/2013 Shibao ............... H04N 1/00244
358/1.14

(Continued)

OTHER PUBLICATIONS

PWG Imaging System Power MIB v1.0, Feb. 14, 2011, PWG, retrieved online on Aug. 1, 2013 from the Internet URL: ftp://ftp.pwg.org/pub/pwg/candidates/cs-wimspowermib10-20110214-5106.5.pdf, pp. 1-24.

(Continued)

*Primary Examiner* — Mohammad Ghayour
*Assistant Examiner* — Jonathan R Beckley
(74) *Attorney, Agent, or Firm* — Carter, DeLuca, Farrell & Schmidt, LLP

(57) ABSTRACT

A management apparatus comprises: management unit which manages a power control rule for a change of a state of the one or more information processing devices; determination unit which determines whether or not the power control ability of the information processing device matches the power control rule; and setting unit which sets the managed power control rule to the information processing device if it has been determined that the power control ability of the information processing device matches the managed power control rule, and sets a new power control rule that matches the power control ability of the information processing device if it has been determined that the power control ability of the information processing device does not match the managed power control rule.

11 Claims, 14 Drawing Sheets

(51) Int. Cl.
*G06K 15/00* (2006.01)
*G03G 15/00* (2006.01)
*H04N 1/00* (2006.01)

(56) References Cited

U.S. PATENT DOCUMENTS

| | | | |
|---|---|---|---|
| 2002/0178387 A1 | 11/2002 | Theron | |
| 2007/0182998 A1* | 8/2007 | Okada | 358/400 |
| 2009/0217065 A1 | 8/2009 | Araujo, Jr. | |
| 2011/0228305 A1* | 9/2011 | Sasase | G06F 3/1221 358/1.13 |
| 2011/0283121 A1* | 11/2011 | Kuroda | G06F 1/3203 713/310 |
| 2011/0296220 A1* | 12/2011 | Arai | 713/323 |
| 2012/0075651 A1* | 3/2012 | Sasase | G06F 1/3209 358/1.13 |
| 2012/0166604 A1 | 6/2012 | Fortier et al. | |
| 2012/0271472 A1* | 10/2012 | Brunner | G06F 1/3209 700/295 |

OTHER PUBLICATIONS

PWG Power Management Model for Imaging Systems 1.0, Feb. 14, 2011, PWG, retrieved online on Aug. 1, 2013 from the Internet URL: ftp://ftp.pwg.org/pub/pwg/candidates/cs-wimspower10-20110214-5106.4.pdf, pp. 1-54.
European Search Report issued in corresponding application No. 14 18 0062 on Jan. 14, 2015.

* cited by examiner

F I G. 1
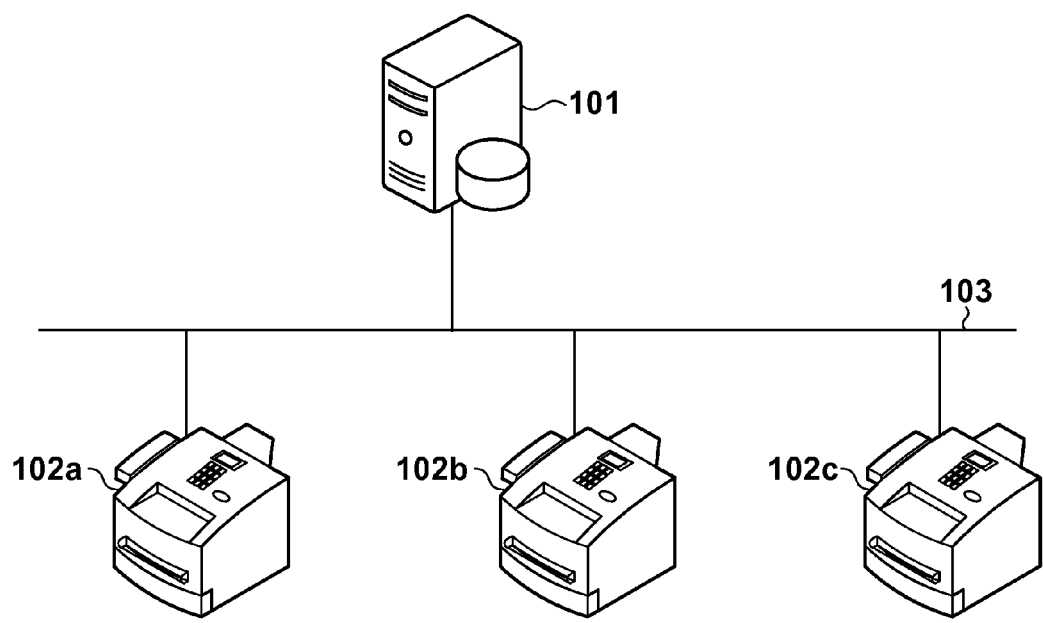

F I G. 5A

| Event ID | Event | RequestPowerStatus | component |
|---|---|---|---|
| 10 | paper jam | standby | finisher |
| 11 | operator call | soft power off | system |

~501

F I G. 5B

| Event ID | Event | RequestPowerStatus | component |
|---|---|---|---|
| 10 | paper jam | standby | finisher |
| 11 | operator call | soft power off | system |

~510

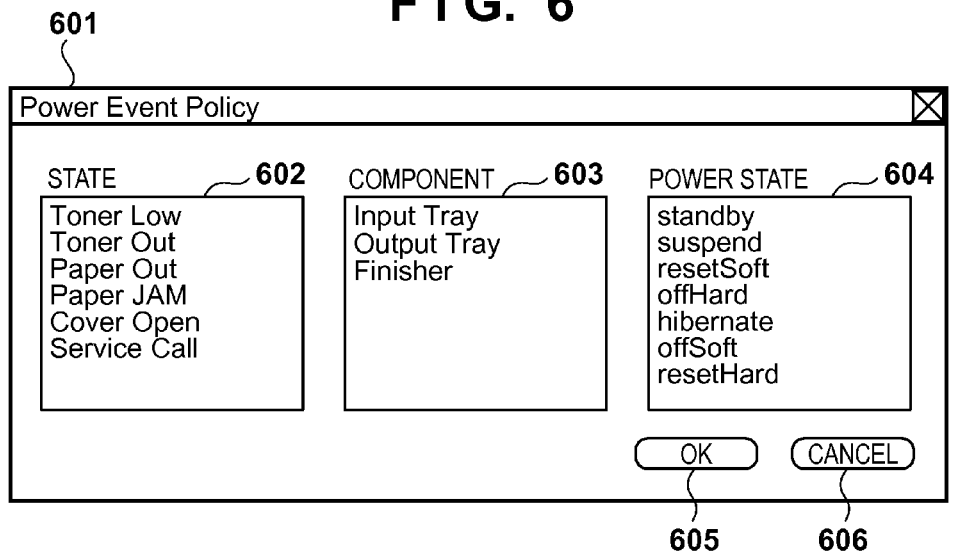

Power Event Policy Settings

DEVICE A  902  903  904

| Paper JAM | SYSTEM | POWER OFF ▽ |
| Service Call | SYSTEM | HIBERNATE ▽ |

OK  CANCEL

| Event ID | Device ID | PowerStatus | component |
|---|---|---|---|
| 10 | 12345678 | hard power off | system |
| 11 | 12345688 | hard power off | system |

| Device ID | target Status | Event ID |
|---|---|---|
| 12345699 | service call | 11 |
| 12345698 | paper jam | 12 |

~1101

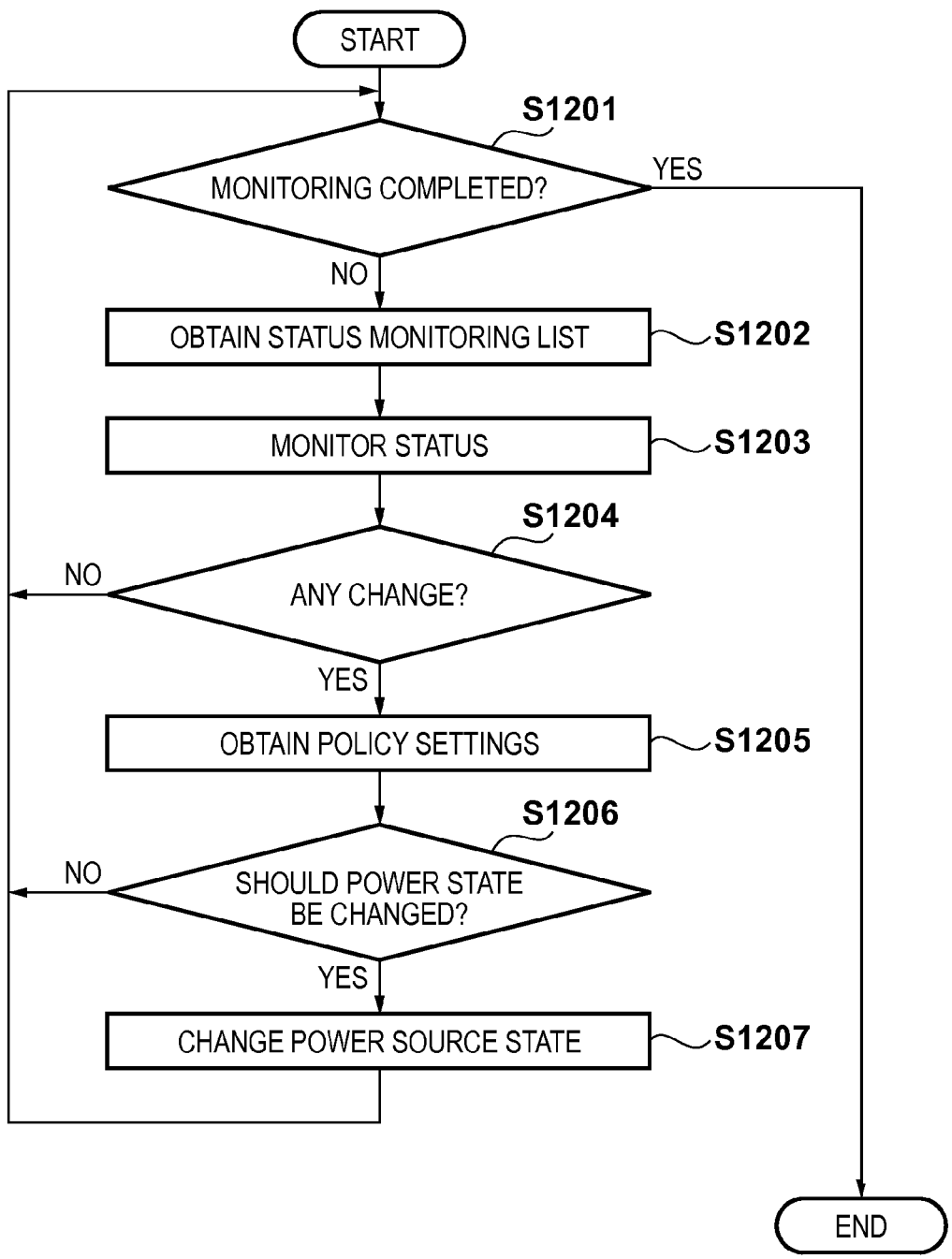
F I G. 12

FIG. 13A

TRANSMISSION SOURCE ADDRESS:192. 168. 1. 2
TRANSMISSION DESTINATION ADDRESS:192. 168. 1. 3
RequestID:1
PDU:Get-Request
VARIABLE NAME:CanRequestPowerStates=suspend(40)

FIG. 13B

TRANSMISSION SOURCE ADDRESS:192. 168. 1. 3
TRANSMISSION DESTINATION ADDRESS:192. 168. 1. 2
RequestID:1
PDU:Get- Response
VALUES (TABLE):
system(5)
inputTray(8)
outputTray(9)
marker(10)
finisher(30)
interface(40)
scanner(50)
faxModem(60)
storage(80)
processor(90)

get PowerManagementCapabilities get PowerManagementCapabilities=On, Shutdown, InterfaceSleep, CPUSleep

F I G. 16A

TRANSMISSION SOURCE ADDRESS:192. 168. 1. 2
TRANSMISSION DESTINATION ADDRESS:192. 168. 1. 3
RequestID:1
PDU:Get-Request
VARIABLE NAME:hrPrinterDetectedErrorState

F I G. 16B

TRANSMISSION SOURCE ADDRESS:192. 168. 1. 3
TRANSMISSION DESTINATION ADDRESS:192. 168. 1. 2
RequestID:1
PDU:Get-Response
VALUE:jammed (5)

F I G. 16C

TRANSMISSION SOURCE ADDRESS:192. 168. 1. 2
TRANSMISSION DESTINATION ADDRESS:192. 168. 1. 3
PDU:TRAP
VALUE:prtAlertCode=jam(8)

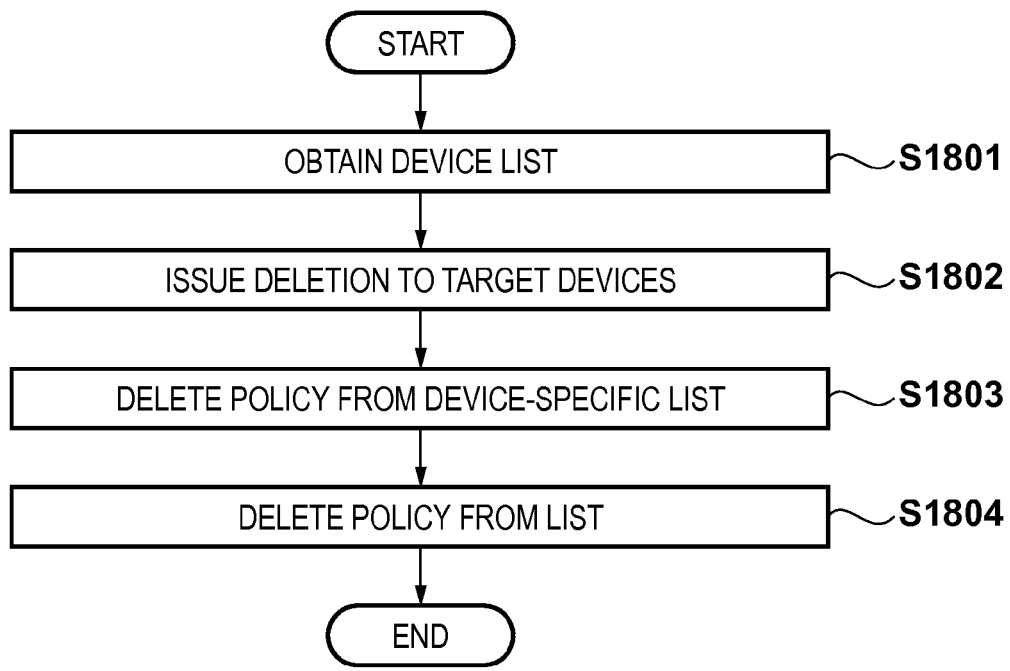

TRANSMISSION SOURCE ADDRESS:192. 168. 1. 2
TRANSMISSION DESTINATION ADDRESS:192. 168. 1. 3
RequestID:1
PDU:Set-Request
VARIABLE NAME:CanRequestPowerStates=None

2001

POWER MANAGEMENT BASIC CONFIGURATION

OPERATION CORRESPONDING TO POWER STATE

● PRIORITIZE POWER SAVING
○ PRIORITIZE CONTINUOUS USE

2002

OK  CANCEL 2003  2004

| ORDER | POWER STATE |
|---|---|
| 1 | standby |
| 2 | suspend |
| 3 | hibernate |
| 4 | offSoft |
| 5 | offHard |

2101

MANAGEMENT APPARATUS, CONTROL METHOD THEREFOR, AND NON-TRANSITORY COMPUTER-READABLE MEDIUM FOR MANAGING POWER CONTROL

BACKGROUND OF THE INVENTION

1. Field of the Invention

The present invention relates to a management apparatus that manages power of a device, a control method therefor, and a non-transitory computer-readable medium.

2. Description of the Related Art

There are rules for power control over a device that are defined based on the viewpoint of, for example, power saving, and these rules are called power management policies, power source management policies, and the like. Meanwhile, rules for controlling power within a device in accordance with a change of a state (event) that has occurred in an apparatus are called event policies and the like.

In this regard, specifications have been proposed that finely define stages of a power state and define power control over components within a device on a per-component basis, so as to finely control power on a per-component basis in accordance with a change of a state of an apparatus (PWG Imaging System Power MIB v1.0, Feb. 14, 2011, PWG, retrieved online on Aug. 1, 2013 from the Internet URL: ftp://ftp.pwg.org/pub/pwg/candidates/cs-wimspowermib10-20110214-5106.5.pdf, and PWG Power Management Model for Imaging Systems 1.0, Feb. 14, 2011, PWG, retrieved online on Aug. 1, 2013 from the Internet URL: ftp://ftp.pwg.org/pub/pwg/candidates/cs-wimspower10-20110214-5106.4.pdf).

To achieve power saving in an entire system using a management apparatus that manages printing devices via a network, administration needs to be performed using event policies. However, some printing devices are partially compatible with event policy management, and some printing devices are not compatible with event policy management. In an environment where such printing devices coexist, it is necessary to perform administration in accordance with the characteristics and features of the respective printing devices.

SUMMARY OF THE INVENTION

According to one aspect of the present invention, there is provided a management apparatus that manages a power state of one or more information processing devices, comprising: management unit configured to manage a power control rule for a change of a state of the one or more information processing devices; obtaining unit configured to obtaining information of a power control ability of an information processing device; determination unit configured to determine, based on the information obtained by the obtaining unit, whether or not the power control ability of the information processing device matches the power control rule managed by the management unit; setting unit configured to set the power control rule managed by the management unit to the information processing device if it has been determined that the power control ability of the information processing device matches the managed power control rule, and to set a new power control rule that matches the power control ability of the information processing device if it has been determined that the power control ability of the information processing device does not match the managed power control rule; detection unit configured to detect the change of the state of the one or more information processing devices; and control unit configured to perform power control over the one or more information processing devices based on the change of the state of the one or more information processing devices and on the power control rule.

According to another aspect of the present invention, there is provided a management apparatus that manages a power state of one or more printing devices, comprising: management unit configured to manage a power control rule for a change of a state of the one or more printing devices; obtaining unit configured to obtain information of a power control ability of a printing device; determination unit configured to determine, based on the information obtained by the obtaining unit, whether or not the power control ability of the printing device matches the power control rule managed by the management unit; setting unit configured to set the power control rule managed by the management unit to the printing device if it has been determined that the power control ability of the printing device matches the managed power control rule, and to set a new power control rule that matches the power control ability of the printing device if it has been determined that the power control ability of the printing device does not match the managed power control rule; detection unit configured to detect the change of the state of the one or more printing devices; and control unit configured to perform power control over the one or more printing devices based on the change of the state of the one or more printing devices and on the power control rule.

According to another aspect of the present invention, there is provided a management apparatus comprising: management unit configured to manage a power control rule for a change of a state of an information processing device; determination unit configured to obtain information of a power control ability of the information processing device and to determine, based on the obtained information, whether or not the power control ability of the information processing device matches the power control rule managed by the management unit; setting configured to set a new power control rule that matches the power control ability of the information processing device if it has been determined that the power control ability of the information processing device does not match the power control rule managed by the management unit; and control unit configured to perform power control over the information processing device based on the change of the state of the information processing device and on the power control rule managed by the management unit.

According to another aspect of the present invention, there is provided a management method for managing a power state of one or more information processing devices, comprising: managing a power control rule for a change of a state of the one or more information processing devices; obtaining information of a power control ability of an information processing device; determining, based on the information obtained in the obtaining step, whether or not the power control ability of the information processing device matches the power control rule managed in the managing step; setting the power control rule managed in the managing step to the information processing device if it has been determined that the power control ability of the information processing device matches the managed power control rule, and setting a new power control rule that matches the power control ability of the information processing device if it has been determined that the power control ability of the information processing device does not match the managed power control rule; detecting the change of the state of the one or more information processing devices; and performing power control over the one or more information processing devices based on the change of the state of the one or more information processing devices and on the power control rule.

According to another aspect of the present invention, there is provided a management method for managing a power state of one or more printing devices, comprising: managing a power control rule for a change of a state of the one or more printing devices; obtaining information of a power control ability of a printing device; determining, based on the information obtained in the obtaining step, whether or not the power control ability of the printing device matches the power control rule managed in the managing step; setting the power control rule managed in the managing step to the printing device if it has been determined that the power control ability of the printing device matches the managed power control rule, and setting a new power control rule that matches the power control ability of the printing device if it has been determined that the power control ability of the printing device does not match the managed power control rule; detecting the change of the state of the one or more printing devices; and performing power control over the one or more printing devices based on the change of the state of the one or more printing devices and on the power control rule.

According to another aspect of the present invention, there is provided a non-transitory computer-readable medium storing a program for causing a computer to function as: management unit configured to manage a power control rule for a change of a state of one or more information processing devices; obtaining unit configured to obtain information of a power control ability of an information processing device; determination unit configured to determine, based on the information obtained by the obtaining unit, whether or not the power control ability of the information processing device matches the power control rule managed by the management unit; setting unit configured to set the power control rule managed by the management unit to the information processing device if it has been determined that the power control ability of the information processing device matches the managed power control rule, and to set a new power control rule that matches the power control ability of the information processing device if it has been determined that the power control ability of the information processing device does not match the managed power control rule; detection unit configured to detect the change of the state of the one or more information processing devices; and control unit configured to perform power control over the one or more information processing devices based on the change of the state of the one or more information processing devices and on the power control rule.

According to another aspect of the present invention, there is provided a non-transitory computer-readable medium storing a program for causing a computer to function as: management unit configured to manage a power control rule for a change of a state of one or more printing devices; obtaining unit configured to obtain information of a power control ability of a printing device; determination unit configured to determine, based on the information obtained by the obtaining unit, whether or not the power control ability of the printing device matches the power control rule managed by the management unit; setting unit configured to set the power control rule managed by the management unit to the printing device if it has been determined that the power control ability of the printing device matches the managed power control rule, and to set a new power control rule that matches the power control ability of the printing device if it has been determined that the power control ability of the printing device does not match the managed power control rule; detection unit configured to detect the change of the state of the one or more printing devices; and control unit configured to perform power control over the one or more printing devices based on the change of the state of the one or more printing devices and on the power control rule.

Even in an environment where a plurality of devices that have different compatibilities with event policies coexist, power control can be performed for the respective devices, and power saving can be achieved as a system.

Further features of the present invention will become apparent from the following description of exemplary embodiments (with reference to the attached drawings).

BRIEF DESCRIPTION OF THE DRAWINGS

FIG. 1 shows a configuration of an entire system according to the present invention.

FIGS. 5A and 5B show examples of event policy lists in the management apparatus and a managed device.

FIG. 6 shows an example of a screen for setting an event policy.

FIG. 7 shows an example of a managed device list.

FIG. 8 shows a hierarchical structure of components included in a managed device.

FIG. 9 shows an example of a screen for setting an event policy of a managed device.

FIG. 10 shows an example of a list of event policies specific to managed devices.

FIG. 11 shows an example of a state monitoring target list.

FIG. 12 is a flowchart of processing for a managed device targeted for monitoring.

FIGS. 13A and 13B show protocol formats with which information obtainment/response is performed regarding a possible power state.

FIGS. 16A, 16B, and 16C show examples of protocol formats for state obtainment, response, and state notification.

FIG. 17 shows an example of an instruction for power control over a device that is not compatible with Power MIB.

FIG. 18 is a flowchart for deleting an event policy.

DESCRIPTION OF THE EMBODIMENTS

<First Embodiment>

Figure 2:
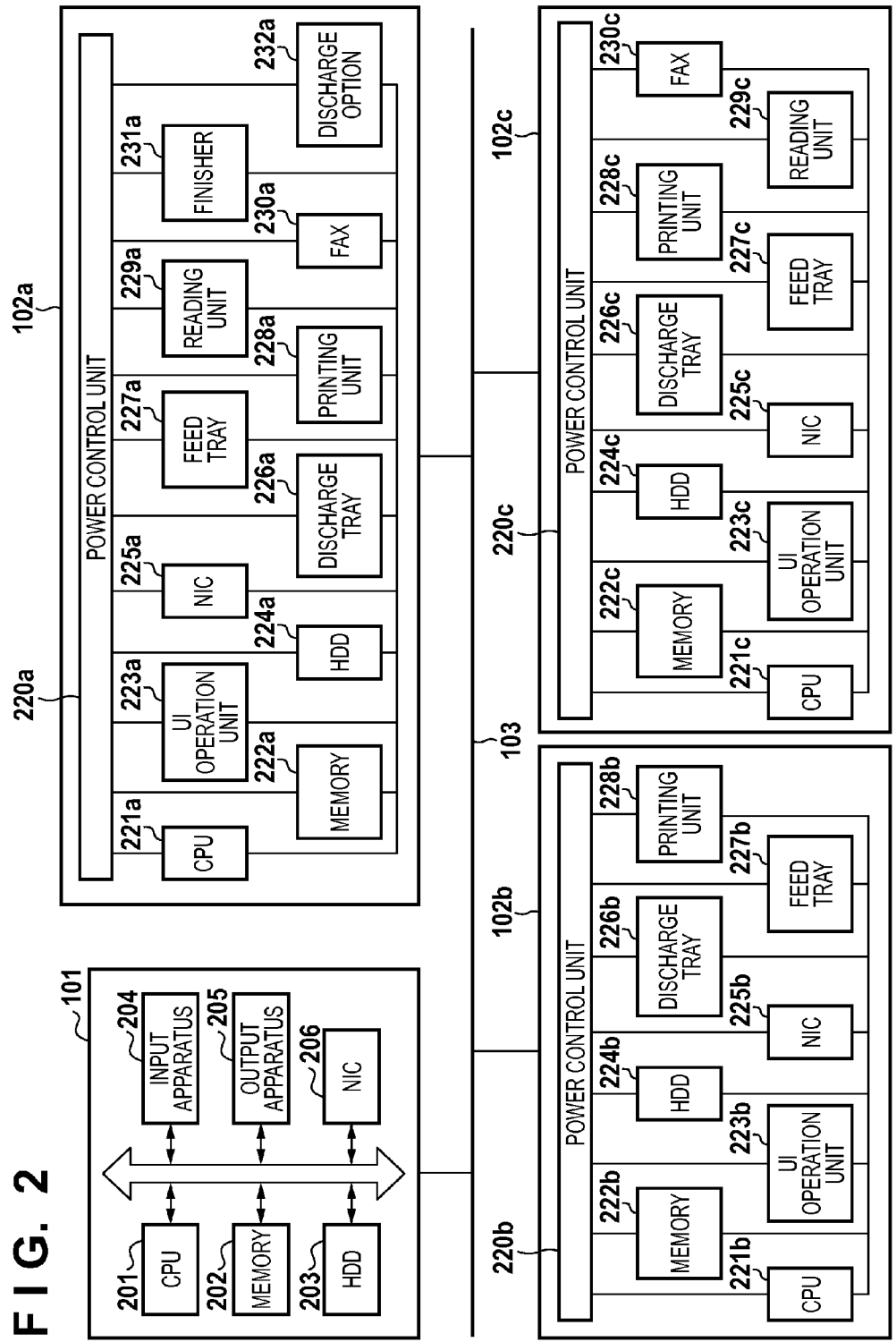
FIG. 2 shows a hardware configuration of the entire system according to the present invention.

The following describes an embodiment of the present invention with reference to the drawings.

[System Configuration]

FIG. 1 shows a configuration of an entire system according to the present embodiment. A management apparatus 101 is connected to a managed device 102a, a managed device 102b, and a managed device 102c, which are printers and the like, via a network 103. The managed devices 102a to 102c are different from one another in hardware and software configurations, and a detail thereof will be described later. Below, it will be assumed that the expression "managed device 102" implies all of the managed devices 102a to 102c. Also, omission of the reference numerals a to c in a description of components included in the managed devices 102a to 102c means that the description applies mutually to the managed devices 102. Examples of the managed devices 102 include printing devices, MFPs (multi-function peripherals), and other information processing devices.

[Hardware Configuration]

FIG. 2 shows a hardware configuration of the entire system according to the present embodiment. A management apparatus 101 is an information processing apparatus, and includes a CPU 201 that executes programs, a memory 202 to which programs are loaded, and an HDD 203 storing programs and various types of data. The management apparatus 101 also includes an input apparatus 204 that accepts user input, an output apparatus 205 that displays a screen on which user input is performed, and a NIC 206 for connecting to a managed device 102 via the network 103.

The managed device 102 includes a power control unit 220. The power control unit 220 is connected to and performs power control over respective components included in the managed device 102. The managed device 102 includes a CPU 221 that executes programs according to the present embodiment, and a memory 222 for temporarily loading programs and various types of data. The managed device 102 also includes a UI operation unit 223 that accepts a user operation, an HDD 224 storing programs and data of the managed device 102, and an NIC 225 for communicating with the management apparatus 101 via the network 103. The managed device 102 further includes a printing unit 228 that has a function of print processing, a discharge tray 226, and a feed tray 227.

Aside from the aforesaid components, the managed device 102a includes a reading unit 229a, a facsimile device 230a, a finisher 231a, and a discharge option 232a such as a stapler. The managed device 102a allows the power control unit 220a to perform power control over the respective components. The managed device 102b does not include any option such as a finisher. The managed device 102b also allows the power control unit 220b to perform power control over the respective components. The managed device 102c includes an option such as a facsimile device 230c, but does not have the ability to perform component-specific power control. Instead, the managed device 102c allows the power control unit 220c to collectively perform power control over the discharge tray 226c, the feed tray 227c, the printing unit 228c, and a reading unit 229c.

In a specific example of power control according to the present embodiment, among the managed devices 102, the managed device 102a is compatible with Power MIB described in PWG Imaging System Power MIB v1.0, Feb. 14, 2011, PWG, retrieved online on Aug. 1, 2013 from the Internet URL: ftp://ftp.pwg.org/pub/pwg/candidates/cs-wim-spowermib10-20110214-5106.5.pdf. A part of the components constituting the managed device 102b is compatible with Power MIB. On the other hand, the managed device 102c has a configuration that is not compatible with Power MIB. It should be noted that, although the managed device 102c is not compatible with Power MIB, power control can be performed therefor using different methods.

[Software Configuration]

Figure 3:
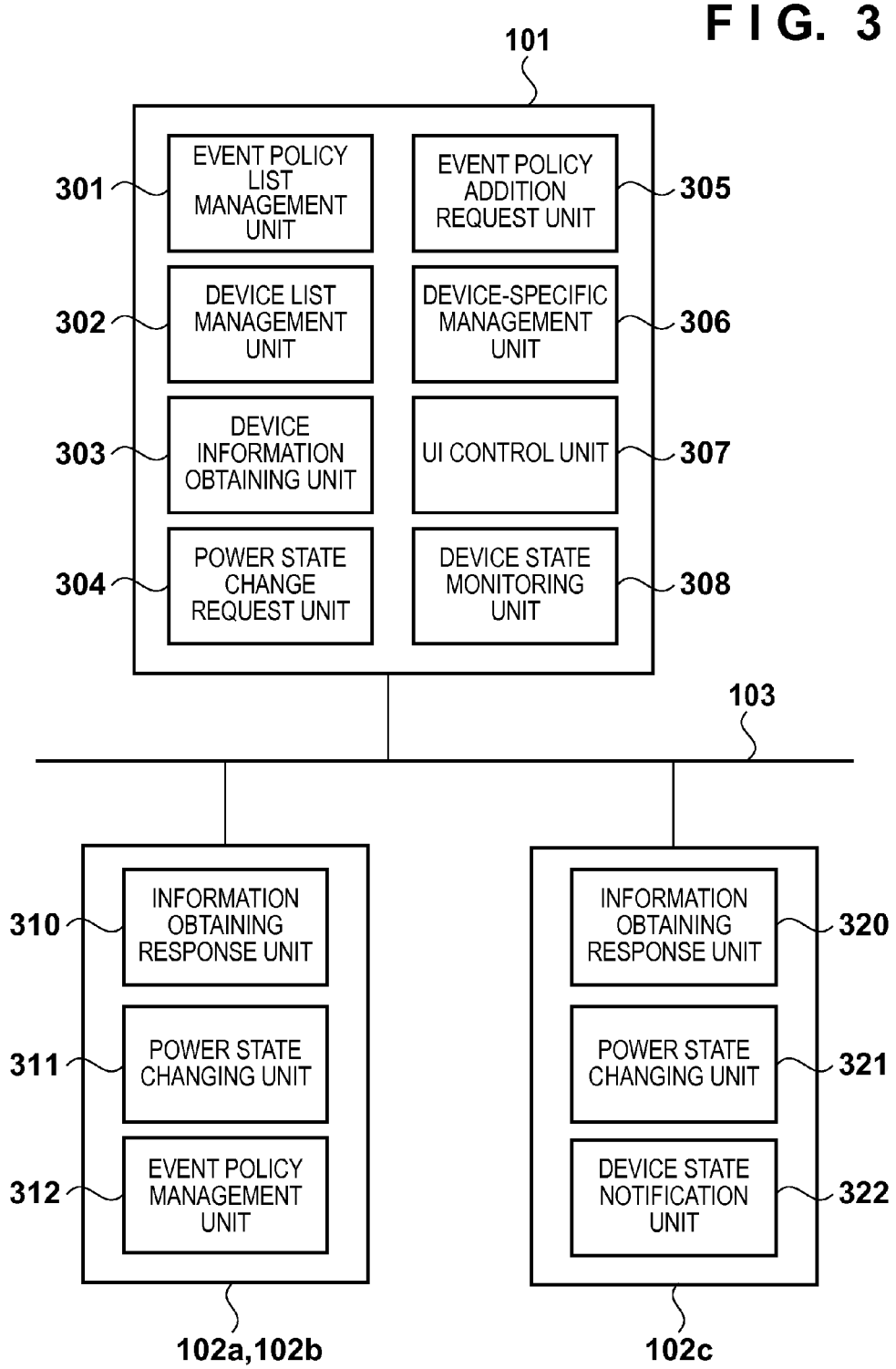
FIG. 3 shows a software configuration according to the present invention.

FIG. 3 shows a software configuration according to the present embodiment. The management apparatus 101 includes an event policy list management unit 301, a device list management unit 302, a device information obtaining unit 303, a power state change request unit 304, an event policy addition request unit 305, a device-specific management unit 306, a UI control unit 307, and a device state monitoring unit 308.

The event policy list management unit 301 manages an event policy. The event policy stipulates a power control rule for changing a power state of a managed device 102 in accordance with a change of a state (event) related to whether or not printing can be performed. The device list management unit 302 manages a list of managed devices 102 targeted for management. The device information obtaining unit 303 obtains information such as a power control ability that can be controlled from a managed device 102. The power state change request unit 304 requests a managed device 102 to change a power state in accordance with the event policy.

The event policy addition request unit 305 requests a managed device 102 to add an operation compatible with the event policy to the managed device 102. The device-specific management unit 306 manages a list of specific power controls for the managed devices 102b and 102c that are not compatible with the event policy. The UI control unit 307 displays a user input screen, and passes information input by a user to another control module. The device state monitoring unit 308 monitors a state of a managed device 102.

The managed devices 102a, 102b include an information obtaining response unit 310, a power state changing unit 311, and an event policy management unit 312. The information obtaining response unit 310 transmits information such as a power control ability to the management apparatus 101 in response to a request from the device information obtaining unit 303 of the management apparatus 101. The power state changing unit 311 controls a power state of the managed devices 102a, 102b in accordance with an event policy managed by the event policy management unit 312. The event policy management unit 312 manages a list of event policies received from the management apparatus 101.

On the other hand, the managed device 102c includes an information obtaining response unit 320, a power state changing unit 321, and a device state notification unit 322. The information obtaining response unit 320 transmits information such as a power control ability to the management apparatus 101 in response to a request from the device information obtaining unit 303 of the management apparatus 101. The power state changing unit 321 controls a power state of the managed device 102c in response to a power state change request from the management apparatus 101. The device state notification unit 322 notifies the management apparatus 101 of a state.

[Processing Flow]

Figure 4:
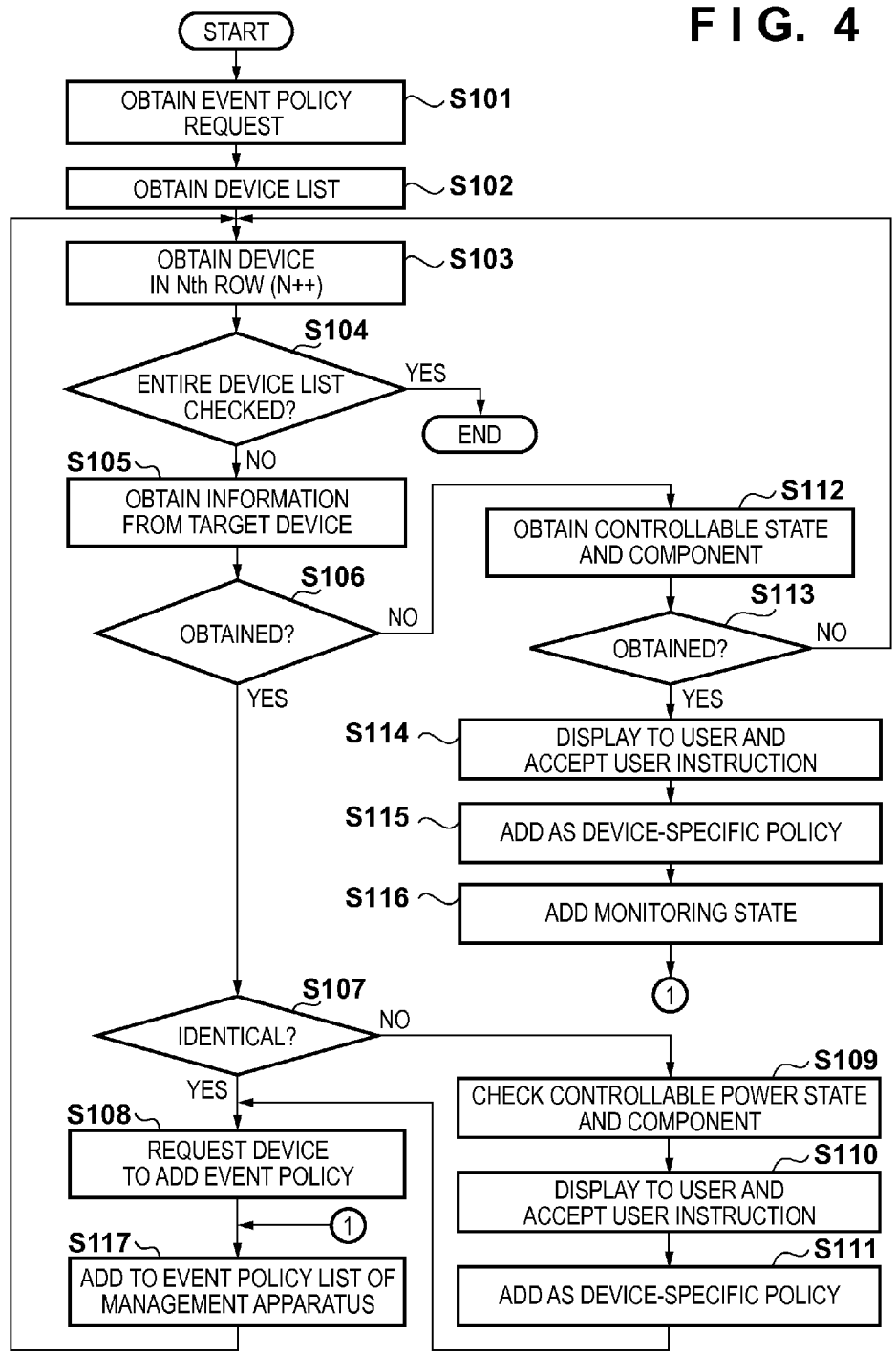
FIG. 4 is a flowchart of a program in a management apparatus according to the present invention.

FIG. 4 is a flowchart of a program in the management apparatus 101 according to the present embodiment. The following describes an operation of the program with reference to the flowchart of FIG. 4. It should be noted that the CPU 201 of the management apparatus 101 that executes the program is the executor of the present processing when a specific executor is not mentioned in the description of the operation of the program. The present processing is executed by the CPU 201 of the management apparatus 101 reading the program held in the memory 202, which is a storage unit, and the like.

The management apparatus 101 has an event policy list 501 shown in FIG. 5A, and manages the event policy list 501 in the event policy list management unit 301. FIG. 5A shows an exemplary structure of the event policy list managed by the management apparatus 101. On the other hand, FIG. 5B shows an event policy list 510 managed by the managed devices 102. The event policy lists 501, 510 hold the following in association with one another: an event ID uniquely indicating an event; an event name; a substance of a power source state on the occurrence of the event; and a target (component) to be controlled in accordance with the power source state.

While the present embodiment is described using a plurality of lists and tables, corresponding columns or items are given the same name.

In order to add a new event policy to the event policy list shown in FIG. 5A, the UI control unit 307 shown in FIG. 3 displays a setting screen 601 shown in FIG. 6 via the output apparatus 205. On the setting screen 601, the user selects a state 602 of the managed devices 102, as well as what component (a component 603 shown in FIG. 6) should switch to what power state (a power state 604 shown in FIG. 6) in that state. It will be assumed that setting values in these state 602, component 603, and power state 604 are defined and managed in advance. For any setting value, displayed substances may be switched (some substances are not displayed, indication of unselectable substances is displayed, etc.) depending on the state of selection in consideration of values that can be used in combination with the setting value.

The CPU 201 of the management apparatus 101 starts step S101 if the user performs operations of selecting setting values in the respective items, i.e., the state 602, the component 603, and the power state 604, and then pressing an OK button 605 on the setting screen 601.

In step S101, the event policy list management unit 301 obtains information designated by the user (the setting values in the state 602, the component 603, and the power state 604). In step S102, the device list management unit 302 obtains a device list 701 shown in FIG. 7. FIG. 7 shows an exemplary structure of a device list, which is a list of managed devices 102 targeted for management. Here, a device ID for uniquely identifying a device, a device name, and an IP address are held in the device list 701 in association with one another. In the example of the present embodiment, it is assumed that the managed devices 102a to 102c are included in the device list 701 as targets of management.

In step S103, the device information obtaining unit 303 extracts information of a managed device 102 in the $N^{th}$ row, such as an IP address, from the device list 701 obtained in step S102. It will be assumed that a row of interest in the device list 701 is N, and a default value is the first row (N=1). Each time step S103 is executed, the target of processing is switched to the next unprocessed row (managed device), and processing is executed therefor.

In step S104, the device information obtaining unit 303 checks whether or not processing has been completed to the last row of the device list 701. If processing has been completed for all rows (managed devices) (YES of step S104), the present processing flow is ended. On the other hand, if processing has not been completed for all rows (NO of step S104), the present processing flow proceeds to step S105. In step S105, the device information obtaining unit 303 obtains information from a managed device 102 targeted for processing via the network 103. Specifically, it inquires the managed device 102 about components that can switch to the power state described in the event policy obtained in step S101. At this time, the information obtained from the managed device 102 via the network 103 is transmitted in a format shown in FIG. 13A using an SNMP (simple network management protocol) as the protocol. For example, if the power state described in the event policy obtained in step S101 is suspend, a value that includes suspend(40) as a power state in a parameter of a variable name is transmitted as shown in the example of FIG. 13A. Known formats can be used as formats shown in FIGS. 13A and 13B, and a detailed description thereof is omitted herein.

In step S106, the device information obtaining unit 303 checks a response from the managed device 102 with respect to the information obtainment of step S105. Specifically, it checks whether or not information related to components that can switch to the power state described in the event policy can be obtained from the managed device 102. For example, the response from the managed device 102 is transmitted from the managed device 102 in a format shown in FIG. 13B and processed by the information obtaining response unit 310. In the case of FIG. 13B, ten components including system(5) and inputTray(8) are indicated as information of components that can be controlled in accordance with the power state suspend(40). If there is no response from the managed device 102 (NO of step S106), the present processing flow proceeds to step S112. If there is a response from the managed device 102 (YES of step S106), the present processing flow proceeds to step S107. Specifically, there is a response if the target of processing is the managed device 102a or the managed device 102b, and there is no response if the target of processing is the managed device 102c. That is to say, values shown in FIG. 13B can be obtained from the managed devices 102a, 102b, but cannot be obtained from the managed device 102c.

In step S107, the event policy list management unit 301 checks whether or not any of the values included in the response obtained from the managed device 102 is identical to a value of the event policy extracted in step S101. For example, assume that the value extracted in step S101 indicates the power state suspend(40), and a component that can be controlled in this power state is finisher(30). In this case, as the values that were obtained from the managed device 102 using the power state suspend(40) as a parameter include finisher(30), it is determined that the event policy and the obtained information match, and the identical value has been obtained. If it is determined that the identical value has been obtained (YES of step S107), the present processing flow proceeds to step S108.

In step S108, the event policy addition request unit 305 transmits, to the managed device 102 targeted for processing, a request for adding the event policy input from the user via the setting screen 601 shown in FIG. 6. In the managed device 102, the event policy management unit 312 adds the event policy input from the user via the setting screen 601 shown in FIG. 6 to the event policy list 510 managed by the managed device 102, and manages the added event policy.

In step S117, the event policy list management unit 301 of the management apparatus 101 adds the event policy to the event policy list 501. That is to say, the newly added event policy is managed both in the event policy list 501 of the management apparatus 101 and in the event policy list 510 of the managed device 102. In the managed device 102 to which the new event policy has been added, the event policy management unit 312 checks the event policy list 510 shown in FIG. 5B. On the occurrence of a change of a state (event), the power state changing unit 311 of the managed device 102 changes a power state in accordance with the event policy. After the process of step S117, the present processing flow proceeds to step S103.

On the other hand, if the event policy list management unit 301 determines that there is no identical value (NO of step S107), the present processing flow proceeds to step S109, and whether or not power control can be performed for another component is determined with reference to a hierarchical structure (parent/child relationship) of components shown in FIG. 8. It will be assumed that information 801 related to the hierarchical structure shown in FIG. 8 is held by the management apparatus 101 in advance. In the present embodiment, the information 801 shows an ID uniquely indicating a component, a parent ID indicating a parent, and a component in association with one another. For example, assume that a component for which power control is desired to be performed is finisher, but components that can be controlled in the managed device 102b are option, engine, and controller. Referring to FIG. 8, a parent ID of finisher (ID=12) is 3, and the ID 3 denotes option. Therefore, the management apparatus 101 can determine that option is a target component for which power control can be performed in the managed device 102b.

In step S110, the UI control unit 307 displays a setting screen 901 shown in FIG. 9 based on the result of determination in step S109 so as to present settable power states and the like to the user. A substance set in the state 602 shown in FIG. 6 is displayed as a state 902. A value indicating the component determined in step S109, i.e., the component for which power control can be performed, is displayed as a component 903. A power state 904 shows control (e.g., a list) for designating how to control a power state with respect to the state and component that have been determined to be controllable in step S109. If an OK button 905 is pressed after accepting a user selection of the power state 904 on the setting screen 901 shown in FIG. 9, the present processing flow proceeds to step S111.

In step S111, based on a user instruction of step S110, the device-specific management unit 306 generates an event policy of the managed device 102 and adds the generated event policy to a list 1001 of event policies specific to managed devices, which is shown in FIG. 10. The list 1001 of event policies specific to managed devices, which is shown in FIG. 10, is managed by the management apparatus 101 separately from the event policy list 501 shown in FIG. 5A. An event ID uniquely indicating an event, a device ID uniquely indicating a managed device, a power state, and a component are held in the list 1001 of event policies in association with one another. That is to say, event policies specific to managed devices 102 indicated by device IDs are shown. After the process of step S111, the present processing flow proceeds to step S108.

On the other hand, if there is no response from the managed device 102 (NO of step S106), the device information obtaining unit 303 of the management apparatus 101 obtains information related to power control from the managed device 102 targeted for processing (in the present example, the managed device 102c) in step S112. At this time, the information related to power control is obtained using a method which is defined by, for example, a Web service and with which the managed device 102c is compatible. For example, an obtainment request is made by transmitting, to the managed device 102c, a command shown in FIG. 14A as a Web service in place of the obtainment request shown in FIG. 13A. That is to say, a method of obtaining the information related to power control is switched in accordance with the function of the managed device 102.

Figures 14A, 14B, 15:
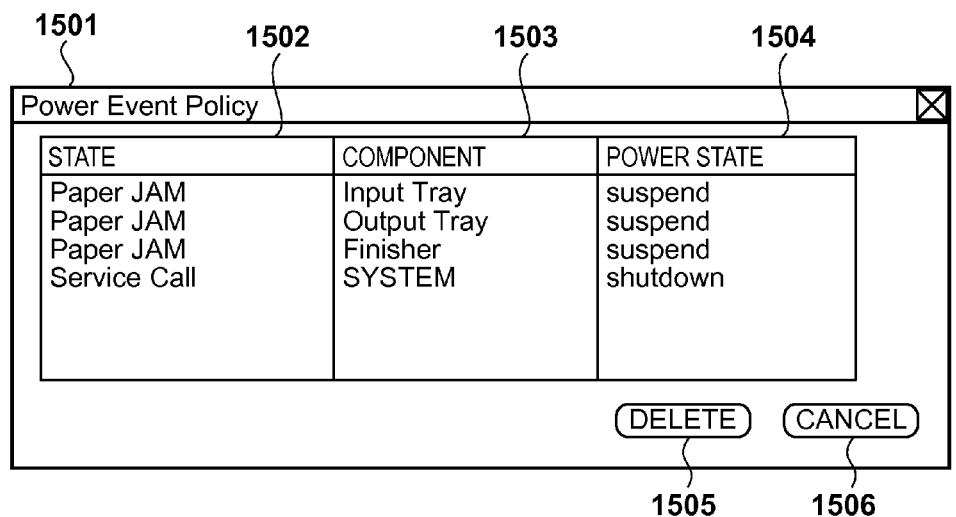
FIGS. 14A and 14B show examples of protocol formats with which a power control ability is obtained/returned from a device that is not compatible with Power MIB.
FIG. 15 shows an example of an event policy display (deletion) screen.

In step S113, the device information obtaining unit 303 checks whether or not there is a response to a request transmitted in step S112 from the managed device 102c (whether or not the information related to power control has been obtained). The present processing flow proceeds to step S114 if there is a response from the managed device 102c (YES of step S113), and proceeds to step S103 if there is no response from the managed device 102c (NO of step S113). For example, the managed device 102c responds to the command shown in FIG. 14A with the information related to power control as shown in FIG. 14B. The example of FIG. 14B indicates that there are four types of power control functions: turning on a power source of the entire system (On); shutting down the power source of the entire system (Shutdown); sleep in which screens are not displayed (InterfaceSleep); and sleep of the CPU (CPUSleep).

In step S114, the UI control unit 307 analyzes the response from the managed device 102c obtained in step S113, and displays values corresponding to the event policy via the setting screen 901 shown in FIG. 9. A conventional method may be used in this analysis of the response. The UI control unit 307 then waits for a user instruction, similarly to step S110. If the OK button 905 is pressed after accepting a user selection of the power state, the device-specific management unit 306 adds a new event policy to the list 1001 of event policies specific to managed devices based on the user instruction in step S115. Here, the new event policy is added to the list 1001 of event policies as an event policy specific to the managed device 102c.

In step S116, the device state monitoring unit 308 adds a state targeted for monitoring to a monitoring target list 1101 shown in FIG. 11, and monitors a change of a state of the managed device 102c which is targeted for monitoring. FIG. 11 shows an exemplary structure of the monitoring target list. A device ID uniquely indicating a managed device, a state of the managed device targeted for management (target status), and an event ID for uniquely identifying an event are held in the monitoring target list 1101 in association with one another. It should be noted that the monitoring target list 1101 manages, for example, devices that are not compatible with power control according to Power MIB and the like among the managed devices 102 included in the device list 701 (in the present example, the managed device 102c). For example, referring to FIG. 11, the managed device 102c has a device ID "12345699". In this case, a change of a state related to whether or not printing can be performed, such as "service call" and "paper jam", is monitored as a target status. A corresponding event (event ID) is associated in accordance with a value of the target status. After the process of step S116, the present processing flow proceeds to step S117.

[Processing for Device Targeted for Monitoring]

With reference to a flowchart of FIG. 12, the following describes processing for a managed device 102 that is targeted for monitoring in step S116 of FIG. 4 (in the present example, the managed device 102c). The present processing flow is realized by the CPU 201 of the management apparatus 101 reading and executing a program stored in the HDD 203, which is a storage unit, and the like.

In step S1201, the management apparatus 101 determines whether or not the monitoring has been completed. For example, the monitoring is completed when the program is completed due to an instruction for completing the program through a user operation and the like. If the monitoring has been completed (YES of step S1201), the present processing flow is ended. If the monitoring is to be performed continuously (NO of step S1201), the device state monitoring unit 308 obtains the monitoring target list (FIG. 11) in step S1202.

In step S1203, the device state monitoring unit 308 monitors the managed device 102c, which is included in the monitoring target list 1101 as a target. In this monitoring, the management apparatus 101 makes an obtainment request to the managed device 102c for a state, using a protocol such as an SNMP, periodically at a regular interval. For example, the management apparatus 101 makes an obtainment request for information in accordance with a structure shown in FIG. 16A. In this case, the managed device 102c can transmit a response to the obtainment request in accordance with a structure shown in FIG. 16B. As another monitoring method, the management apparatus 101 may perform notification registration such that the managed device 102c transmits a notification of a change of a state (event). In this case, the managed device 102c for which the notification registration has been performed transmits information of a change of a state (event) to the management apparatus 101 on the occurrence of the change of the state (event) therein. A substance of a packet transmitted at this time can be structured as shown in FIG. 16C.

In step S1204, the device state monitoring unit 308 determines whether or not the obtained information of the state has changed from information that was previously obtained. That is to say, the device state monitoring unit 308 determines whether or not the change of the state has been detected. If the state has not changed (NO of step S1204), the device state monitoring unit 308 proceeds to step S1201 without making any change to the current state being managed. If the state has been changed (YES of step S1204), the device state monitoring unit 308 checks the monitoring target list 1101 in step S1205.

In step S1206, based on the obtained information of the state, the device state monitoring unit 308 determines whether or not a state in which a power source state should be changed has occurred. Specifically, with reference to the monitoring target list 1101, it checks whether or not the managed device 102c targeted for monitoring is in a state indicated by the target status of the monitoring target list 1101. If it is determined that a state in which a power source state should be changed has occurred (YES of step S1206), the power state change request unit 304 sets the managed device 102c to change a power state using a protocol such as a WEB service in step S1207. For example, a command shown in FIG. 17 is used to instruct the managed device 102c to change a state. After the process of step S1207, the present processing flow proceeds to step S1201. If it is determined that a state in which a power source state should be changed has not occurred (NO of step S1206), the present processing flow proceeds to step S1201.

[Event Policy Deletion Processing]

The event policy list 501 and the list 1001 of event policies specific to managed devices, which are managed by the management apparatus 101 and shown in FIGS. 5A and 10, respectively, are presented to the user by the UI control unit 307 of the management apparatus 101 via an event policy display screen 1501 shown in FIG. 15. The event policy display screen 1501 displays correspondence relationships among the state, component, and power state defined in the respective event policy lists as a state 1502, component 1503, and power state 1504 in association with one another. On the event policy display screen 1501, an added event policy can be deleted as well. A description is now given of processing for deleting an added event policy following a flowchart of FIG. 18. The present processing flow is realized by the CPU 201 of the management apparatus 101 reading and executing a program stored in the HDD 203, which is a storage unit, and the like.

First, the UI control unit 307 of the management apparatus 101 displays the event policy display screen 1501 when, for example, a user operation is performed. The UI control unit 307 starts processing of FIG. 18 upon acceptance of pressing of a delete button 1505 while one of the policies on the event policy display screen 1501 is being selected.

In step S1801, the device list management unit 302 obtains the device list 701 shown in FIG. 7. In step S1802, based on a user instruction, the device information obtaining unit 303 issues an event policy deletion instruction to managed devices 102 included in the obtained device list 701. The deletion instruction can be issued using, for example, an SNMP Set-Request shown in FIG. 19. In step S1803, the event policy list management unit 301 deletes the event policy targeted for deletion from the list 1001 of event policies specific to managed devices, which is shown in FIG. 10. In step S1804, the event policy list management unit 301 deletes the event policy targeted for deletion from the event policy list 501.

According to the present embodiment, in a system where devices that have different compatibilities with event policies coexist, power control and event policies can be managed for the respective devices.

<Second Embodiment>

According to the first embodiment, in generating a list of event policies specific to managed devices (the list 1001 of event policies shown in FIG. 10), policies are set using the setting screen 901 shown in FIG. 9 in accordance with a user selection. In the present embodiment, an operational configuration that serves as a policy for an operation corresponding to a power state is accepted from the user in advance using a setting screen 2001 shown in FIG. 20.

Figure 22:
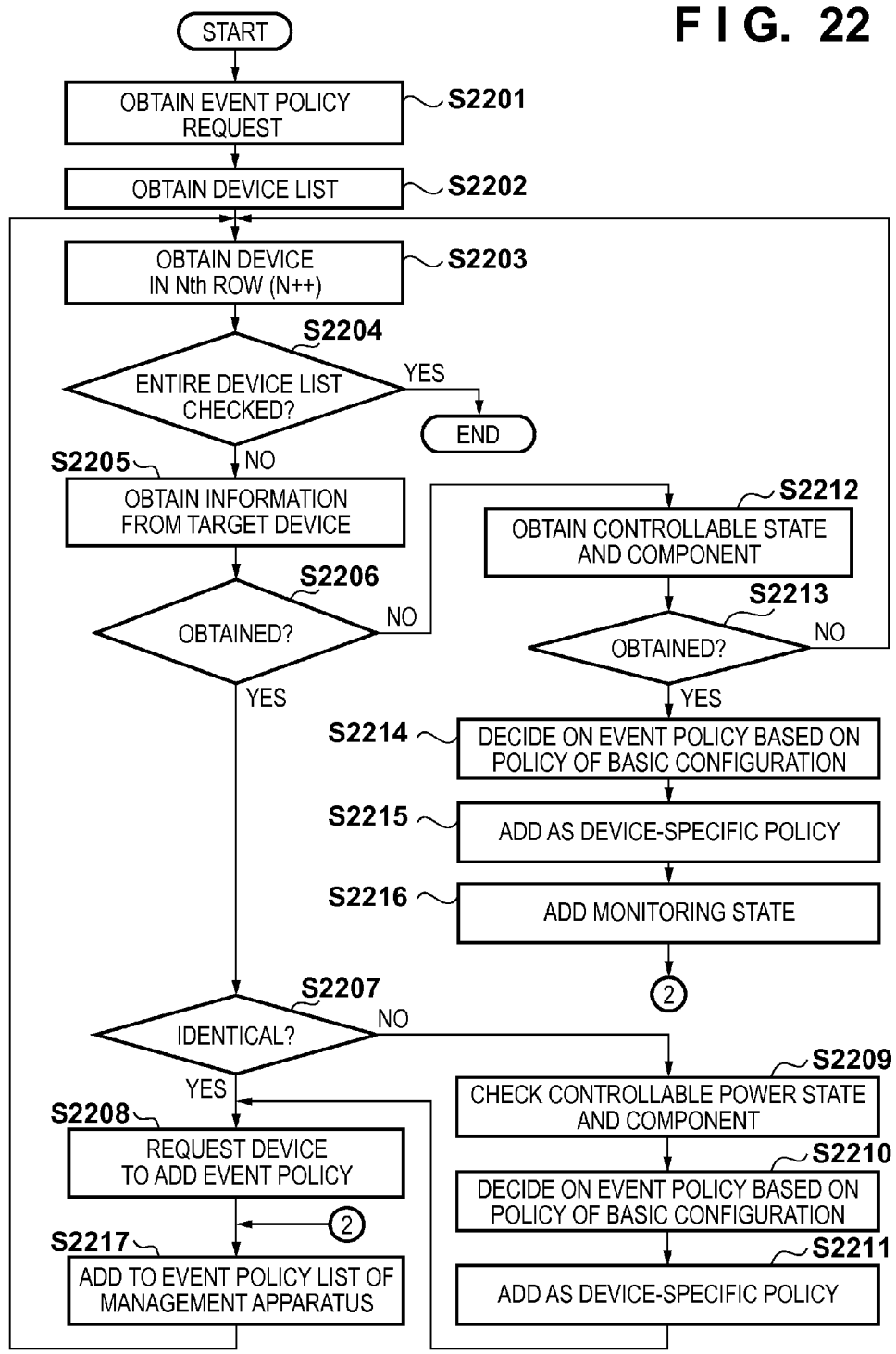
FIG. 22 is a flowchart of a program in a management apparatus according to a second embodiment.

Processing according to the second embodiment will now be described with reference to a flowchart of FIG. 22. It should be noted that the flowchart of FIG. 22 differs from the flowchart of FIG. 4 described in the first embodiment in steps S2210 and S2214. Step S2210 corresponds to step S110 of FIG. 4, whereas step S2214 corresponds to step S114 of FIG. 4. As other processes are the same as those of FIG. 4, a description of overlapping portions is omitted.

Figures 19, 20, 21:
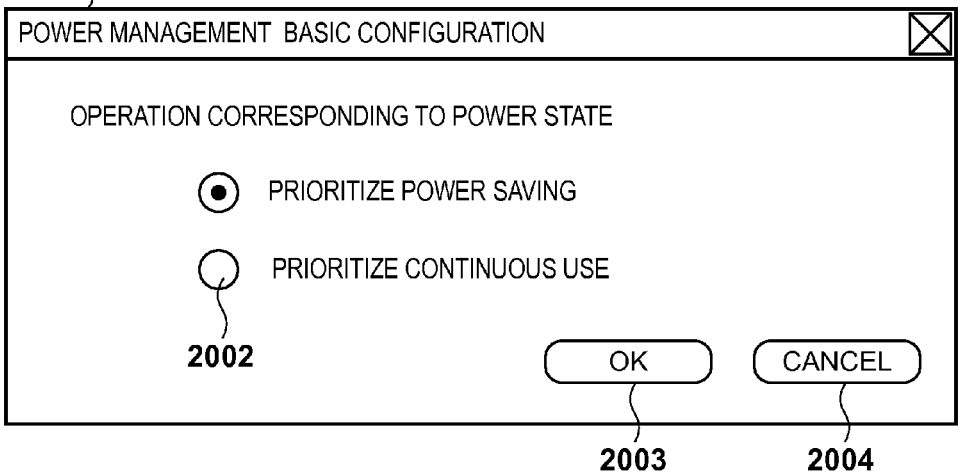
FIG. 19 shows an example of a format for deleting an event policy.
FIG. 20 shows an example of a screen for inputting a power management policy that serves as a basis of an event policy.
FIG. 21 shows an example of a priority order table for power control.

In steps S2210 and S2214, the management apparatus 101 decides on an event policy in accordance with a substance of a configuration that has been pre-set on the setting screen 2001 shown in FIG. 20. Here, the configuration is set in accordance with a power priority order table 2101 shown in FIG. 21. In the power priority order table 2101 shown in FIG. 21, a power state that achieves a higher power saving effect is ranked higher. On the other hand, a low-ranked power state maintains a state in which a device can operate continuously.

Specifically, if "Prioritize Power Saving" is selected on the setting screen 2001 shown in FIG. 20, a power state that is ranked highest in the power priority order table 2101 is selected from among all the values that a managed device 102 can take as power states. On the other hand, if "Prioritize Continuous Use" is selected, a power state that is ranked lowest in the priority order table 2101 is selected from among all the values that a managed device 102 can take as power states.

In addition to achieving the effect of the first embodiment, the present embodiment can automatically define an event policy specific to a managed device without causing the user to make a selection, even in the case of a printing device that has a power state incompatible with event policies.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos.2013-176079, filed Aug. 27, 2013, and 2014-110436, filed May 28, 2014, which are hereby incorporated by reference herein in their entirety.

What is claimed is:

1. A management apparatus comprising:
a management unit configured to manage a power control rule for a change of a state of one or more information processing devices;
an obtaining unit configured to obtain information of a power control ability of an information processing device of the one or more information processing devices;
a determination unit configured to determine, using the information of the power control ability of the information processing device obtained by the obtaining unit, whether or not power control of the information processing device can be performed based on the power control rule managed by the management unit;
a setting unit configured, if the determination unit determines that the power control of the information processing device cannot be performed based on the power control rule managed by the management unit, to set a power control rule different from the power control rule managed by the management unit so as to match the power control ability of the information processing device;
a detection unit configured to detect the change of the state of the information processing device; and
a control unit configured to perform power control over the information processing device based on the change of the state of the information processing device detected by the detection unit and on the power control rule set by the setting unit,
wherein if the determination unit determines the power control of the information processing device cannot be performed based on the power control rule managed by the management unit, the setting unit sets a power control rule based on a pre-set operational configuration that is prioritized in power control,
wherein the pre-set operational configuration is a configuration indicating whether to prioritize power saving or to prioritize continuation of an operation of the information processing device in power control, and
wherein at least one of the management unit, the obtaining unit, the determination unit, the setting unit, the detection unit, and the control unit is implemented by a processor and a memory.

2. The management apparatus according to claim 1, wherein
if the determination unit determines the power control of the information processing device cannot be performed based on the power control rule managed by the management unit, the setting unit displays a screen for accepting a configuration of a power control rule from a user.

3. The management apparatus according to claim 1, wherein
the management unit ranks a plurality of power states based on effects of power saving in power control, and a power control rule is set based on a ranking and on the pre-set operational configuration.

4. The management apparatus according to claim 1, wherein
the management unit manages a power control rule that mutually matches the information processing devices as well as a power control rule specific to an information processing device, the specific power control rule being set by the setting unit in accordance with a power control ability of the information processing device.

5. The management apparatus according to claim 1, wherein
the power control rule defines power control over a plurality of components included in the information processing device on a per-component basis in accordance with a change of a state of the information processing device.

6. The management apparatus according to claim 5, wherein
the management unit further manages information defining a parent/child relationship among the plurality of components included in the information processing device, and
if the determination unit determines the power control of the information processing device cannot be performed based on the power control rule managed by the management unit, the setting unit generates a new power control rule that matches the power control ability of the information processing device using the information defining the parent/child relationship among the plurality of components, and sets the generated power control rule.

7. The management apparatus according to claim 1, wherein
in obtaining information of a power control ability of an information processing device, the obtaining unit switches an obtainment method in accordance with a function with which the information processing device is compatible.

8. The management apparatus according to claim 1, further comprising:
a deletion unit configured to display a screen on which a user deletes the power control rule managed by the management unit.

9. A management apparatus comprising:
a management unit configured to manage a power control rule for a change of a state of one or more printing devices;
an obtaining unit configured to obtain information of a power control ability of a printing device of the one or more printing devices;
a determination unit configured to determine, using the information of the power control ability of the printing device obtained by the obtaining unit, whether or not power control of the printing device can be performed based on the power control rule managed by the management unit;
a setting unit configured, if the determination unit determines that the power control of the printing device cannot be performed based on the power control rule managed by the management unit, to set a power control rule different from the power control rule managed by the management unit so as to match the power control ability of the printing device;
a detection unit configured to detect the change of the state of the printing device; and
a control unit configured to perform power control over the printing device based on the change of the state of the printing device detected by the detection unit and on the power control rule set by the setting unit,
wherein if the determination unit determines the power control of the printing device cannot be performed based on the power control rule managed by the management unit, the setting unit sets a power control rule based on a pre-set operational configuration that is prioritized in power control,
wherein the pre-set operational configuration is a configuration indicating whether to prioritize power saving or to prioritize continuation of an operation of the printing device in power control, and
wherein at least one of the management unit, the obtaining unit, the determination unit, the setting unit, the detection unit, and the control unit is implemented by a processor and a memory.

10. A management method comprising:
managing a power control rule for a change of a state one or more information processing devices;
obtaining information of a power control ability of an information processing device of the one or more information processing devices;
determining, using the information of the power control ability of the information processing device obtained in the obtaining step, whether or not the power control of the information processing device can be performed based on the power control rule managed in the managing step;
if in the determining step, it is determined that the power control of the printing device cannot be performed based on the power control rule managed in the managing step, setting a power control rule different from the power control rule managed in the managing step so as to match the power control ability of the information processing device;
detecting the change of the state of the information processing device; and
performing power control over the information processing device based on the change of the state of the information processing device detected in the detecting step and on the power control rule set in the setting step,
wherein, if it is determined that the power control of the information processing device cannot be performed based on the power control rule managed in the managing step, a power control rule is set based on a pre-set operational configuration that is prioritized in power control in the setting step, and
wherein the pre-set operational configuration is a configuration indicating whether to prioritize power saving or to prioritize continuation of an operation of the information processing device in power control.

11. A non-transitory computer-readable medium storing a program for causing a computer to function as:
a management unit configured to manage a power control rule for a change of a state of one or more information processing devices;
an obtaining unit configured to obtain information of a power control ability of an information processing device of the one or more information processing devices;
a determination unit configured to determine, using the information of the power control ability of the information processing device obtained by the obtaining unit, whether or not power control of the information processing device can be performed based on the power control rule managed by the management unit;
a setting unit configured, if the determination unit determines that the power control of the information processing device cannot be performed based on the power control rule managed by the management unit, to set a power control rule different from the power control rule managed by the management unit so as to match the power control ability of the information processing device;
a detection unit configured to detect the change of the state of the information processing device; and
a control unit configured to perform power control over the information processing device based on the change of the state of the information processing device detected by the detection unit and on the power control rule set by the setting unit,
wherein if the determination unit determines the power control of the information processing device cannot be performed based on the power control rule managed by the management unit, the setting unit sets a power control rule based on a pre-set operational configuration that is prioritized in power control, and
wherein the pre-set operational configuration is a configuration indicating whether to prioritize power saving or to prioritize continuation of an operation of the information processing device in power control.

* * * * *